UNITED STATES PATENT OFFICE.

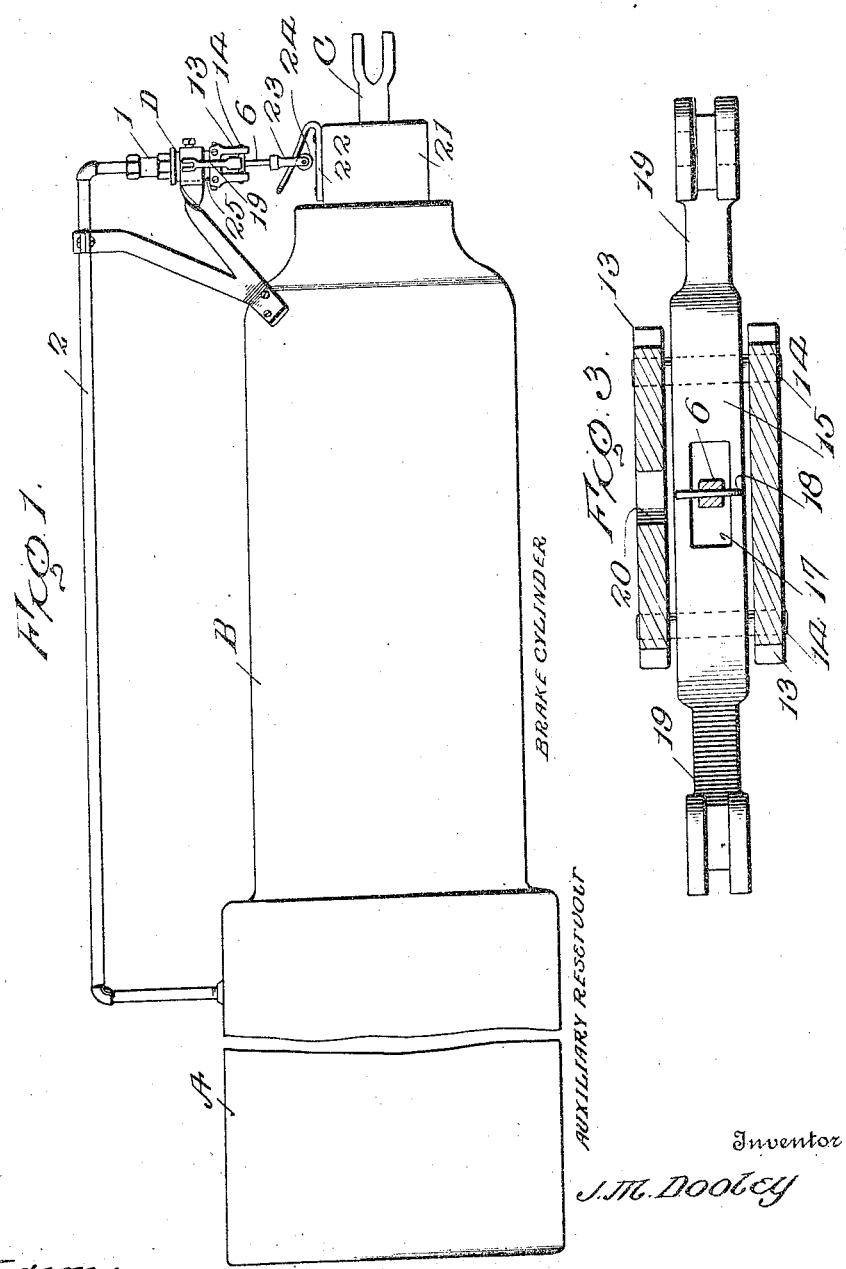

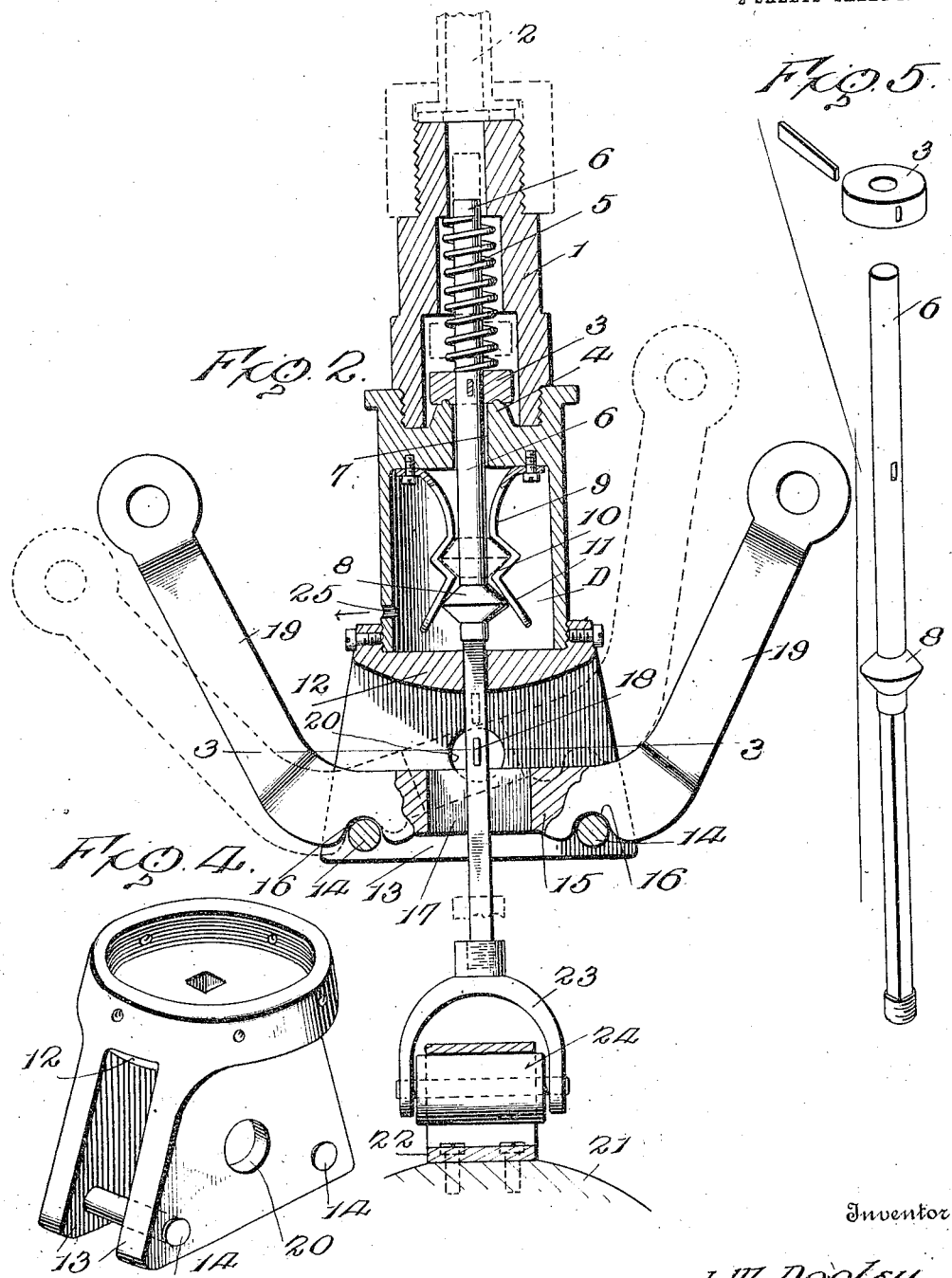

JOHN M. DOOLEY, OF BLOOMINGTON, ILLINOIS.

BLEED-COCK FOR AIR-BRAKES.

983,610.   Specification of Letters Patent.   Patented Feb. 7, 1911.

Application filed April 15, 1910. Serial No. 555,689.

*To all whom it may concern:*

Be it known that I, JOHN M. DOOLEY, a citizen of the United States, residing at Bloomington, in the county of McLean and State of Illinois, have invented certain new and useful Improvements in Bleed-Cocks for Air-Brakes, of which the following is a specification.

As is well known, it is necessary at times in the operation of air brake mechanism, as generally applied to railway equipment, to bleed the auxiliary reservoir and brake cylinder in order to insure the release of the brakes. This operation is usually attended with loss of time owing to the necessity for the brakeman to manually hold the valve of the bleed cock open until the brakes have been fully released, and is also accompanied by a considerable expenditure of manual energy in order to insure the positive release of the brakes after they have been once set.

This invention has for its primary object a bleed cock of novel structure for use in connection with the auxiliary reservoir and air brake cylinder of an air brake mechanism, and which when once opened will hold the valve away from its seat until the brakes have been wholly released, at which time, the valve will be automatically closed, being tripped by a part of the brake mechanism.

The invention also has for its object, novel means for positively holding the valve open and other means for positively releasing the valve from the holding means and permitting the valve to automatically close, the releasing means being actuated automatically by the brake mechanism when the brakes have been fully released.

The invention also has for its object a simple, durable and efficient construction of bleed cock of this character whereby the operator can test the air and bleed cock at the same time, whereby the operator may open or close the valve at pleasure without interfering with the automatically operating elements of the invention, whereby the bleed cock may be attached to an air brake equipment regardless of whether the auxiliary reservoir is combined with the brake cylinder or is situated elsewhere on the car frame and whereby, as the air is vented through the aperture formed in the valve case, the hissing of air will warn the brakeman or other trainman as he passes the car, that the brakes have failed to release when he opened the valve, the hissing of course ceasing as soon as the brakes have been fully released.

With these and other objects in view as will more fully appear as the description proceeds the invention consists in certain constructions, arrangements and combinations of the parts that I shall hereinafter fully describe and claim.

For a full understanding of the invention, reference is to be had to the following description and accompanying drawings in which:

Figure 1 is a side elevation of a brake cylinder and a portion of an auxiliary reservoir equipped with the improvements of my invention; Fig. 2 is an enlarged sectional view of the device; Fig. 3 is a horizontal sectional view, the section being taken approximately on the line 3—3 of Fig. 2; Fig. 4 is a detail perspective view of a lever support hereinafter specifically referred to; and, Fig. 5 is a detail perspective view of the valve stem.

Corresponding and like parts are referred to in the following description and indicated in all the views of the accompanying drawings by the same reference characters.

Referring to the drawings A designates an auxiliary reservoir, B a brake cylinder, and C the piston rod which works in the brake cylinder, all of these parts may be of any desired or conventional type or design, the auxiliary reservoir, as in some instances, being directly connected to the brake cylinder as illustrated in Fig. 1, or being more or less remote therefrom, as is sometimes the case.

D designates the valve casing of the bleed-cock which may be disposed either below or above the brake cylinder and is provided with a nipple 1 by which it is designed for engagement with a pipe 2 leading to the bleed-cock from the auxiliary reservoir A. The nipple 1 may be of any ordinary or desired construction, connected together in any desired way as may also be the valve 3 which is mounted within a chamber formed in the nipple 1 and which is adapted to be pressed upon the ordinary seat 4 by a spring 5 encircling the valve stem 6. The valve stem 6 passes from the valve seat 4 through an opening 7 which is formed in the casing D, the opening being somewhat larger than the valve stem so as to permit the free passage of air into the valve seat and the casing, when the valve 3 is off of the seat. Within the casing D, the valve stem 6 is formed with a protuberance 8 of any desired character, the same being preferably bulbous, and in the present embodiment of the invention substantially of the form of a double truncated cone secured to or formed on the valve stem in any desired way. This stop or protuberance is designed, when the valve is moved off of its seat, to be engaged by one or more preferably spring detents 9, two being employed in the present instance, set in diametrical relation to the valve stem, whereby the pressure thereon will be equalized, and lateral strains avoided. In the present instance, these spring latches 9 are formed intermediate of their ends with substantially V-shaped jaws 10 designed to directly engage the protuberance or stop 8 and with diverging extremities 11 insuring that the stop will be properly directed in between the arms facilitating the movement of the stop therein.

Located near one end of the casing D is a casting 12 the base plate of which constitutes a cap or closure for the end of the casing opposite the valve 4, said base plate being formed with an opening through which the valve stem 6 passes, as clearly illustrated in the drawings, and this casting also embodies spaced standards 13 and transversely extending pins 14 secured thereto. A lever 15 is mounted in between the standards 13 and is arranged to rock freely therein upon either pin 14 as a fulcrum. Preferably the lever is formed with recesses 16 for the proper engagement with the pins. This lever is also formed with a relatively large opening 17 in which the valve stem 6 is freely received, the stem at this point being provided with a transverse pin 18 which is adapted to be engaged by the lever as the latter is rocked in one direction or the other so as to manually move the valve stem 6 in a direction to carry the valve 3 away from the seat 4. This lever is provided with two arms 19 as shown, and is adapted for manual actuation in the well known manner. To facilitate the insertion of the pin 18 in the stem 6, one of the standards 13 is formed with an opening 20.

The piston rod or stem C of the brake cylinder B carries a sleeve 21, and a substantially V-shaped spring 22 is secured by one of its leaf or plate arms to the sleeve, the other arm being free to extend as just indicated at an acute angle to the attached arm of the spring. As best seen in Fig. 2, the tapering end of the valve stem 6 where it passes out from between the standards 13 to a point beyond the free edges thereof is connected by a screw-joint, or in any other way to a fork 23, a roller 24 being journaled in the fork and the free arm of the spring 22 is adapted, when the sleeve moves into the brake cylinder by the movement of the piston rod or stem C to the release position, to enter the fork 23 and engage the roller 24 so as to pull upon the valve stem 6 and release the stop 8 from the detents 9 so as to permit the valve 3 to close upon the seat 4 under the influence of its spring 5, or by gravity if desired, although I prefer the positive action which is obtained by the use of a spring.

From the foregoing description in connection with the accompanying drawings, the operation of my improved bleed-cock will be apparent.

In the practical use of the device, in the event that the brakes fail to release when required, the valve 3 will be moved to its open position in the usual manner and be held open by the automatic engagement of the detents 9 with the stop 8. With the valve in this position, it is evident that the air in the auxiliary reservoir and brake cylinder back of the piston of the latter may be vented through the pipe 2 into the valve casing D and escape to the aperture through a vent or aperture 25 formed in the casing. After the air brakes have been fully released, it is obvious that the piston stem C of the brake cylinder will have brought the sleeve 21 into said cylinder and the free arm of the spring 22 will thereupon engage the roller 24 and pull the valve stem 6 in a direction to release the stop or protuberance 8 from the detents 9, the valve 6 immediately and automatically closing. It will thus be understood, that should it become necessary to open the bleed-cock to insure the release of the brakes, the valve of the bleed-cock will be held open automatically and release and automatically close without any attention on the part of the brakeman or other operator. The instant the pressure is sufficiently reduced to permit the release of the brakes, the bleed-cock will close, thereby preventing the waste of power and insuring the proper operation of the parts.

Having thus described the invention, what is claimed as new is:

1. In a bleed-cock for air brake mechanism, the combination with the valve stem thereof, of a stop applied to the stem and oppositely disposed coöperating detents secured to the casing of the valve and adapted to engage with the stop and hold the valve unseated when opened.

2. In a bleed-cock for air-brake mechanism, the combination with the valve and stem thereof, and a casing for said stem, of a stop applied to said stem, and oppositely disposed spring detents secured at one end to the casing, said detents being formed intermediate of their ends with jaws adapted to engage said stop and diverging opposite ends adapted to receive the stop as it is moved into the jaws.

3. In an air-brake mechanism, the combination with a casing provided with a valve seat, of a valve adapted to close on said seat, a stem to which the valve is connected, the stem being provided with a roller and a device carried by the piston rod of the brake cylinder arranged to engage the roller and move the stem in a direction to close the valve upon its seat upon the movement of the piston rod to release position.

4. In an air-brake mechanism, the combination with a valve casing provided with a valve seat, of a valve adapted to close on said seat, a stem to which the valve is connected, means within the casing for engaging the stem and holding the valve in an open position, a fork carried by the stem, a roller journaled in the fork and a V-shaped trip one arm of which is connected to the piston rod of the brake cylinder, the other arm of said trip being adapted to extend into the fork and into engagement with the roller whereby to release the valve stem from its holding means upon the movement of the piston and trip to the release position.

5. In an air-brake mechanism, the combination with a casing provided with a valve seat, of a valve adapted to close on said seat, a stem to which the valve is secured, means within the casing for engaging the valve stem to hold the valve in open position, spaced standards connected to the casing, fulcrum pins carried by said standards, the valve stem passing between the standards and beyond the same and provided with a pin, a lever mounted to rock on said fulcrum pins between the standards and having an opening through which the stem passes, the lever being designed for engagement with the pin of the stem, whereby to move the stem in a direction for engagement by its holding means, a fork carried by the end of the stem, a roller journaled in the fork and a trip device carried by the piston rod of the brake cylinder and adapted to enter the fork and engage with the roller whereby to move the stem in a direction to disengage it from its holding means upon the movement of the piston rod to the release position.

In testimony whereof, I affix my signature in presence of two witnesses.

JOHN M. DOOLEY. [L. S.]

Witnesses:
  JOHN G. BOEKER,
  WALTER SHULTZ.